United States Patent [19]
Hahm et al.

[11] Patent Number: 5,408,295
[45] Date of Patent: Apr. 18, 1995

[54] METHOD OF MAKING STEREOSCOPIC IMAGES IN A CIRCULAR PATTERN

[75] Inventors: Timothy P. Hahm; Joseph A. Manico; Arthur P. Welner, all of Rochester, N.Y.

[73] Assignee: Eastman Kodak Company, Rochester, N.Y.

[21] Appl. No.: 197,622

[22] Filed: Feb. 16, 1994

Related U.S. Application Data

[62] Division of Ser. No. 71,134, Jun. 2, 1993, Pat. No. 5,319,417.

[51] Int. Cl.⁶ .............................................. G03B 35/00
[52] U.S. Cl. ..................................... 355/22; 355/46; 354/114
[58] Field of Search ................ 354/112, 114; 355/22, 355/46, 77

[56] References Cited

U.S. PATENT DOCUMENTS

| 4,314,758 | 2/1982 | Kazierod | 355/40 |
| 4,761,874 | 8/1988 | Utsui | 29/527.2 |
| 5,136,319 | 8/1992 | Ushiro et al. | 354/114 |

Primary Examiner—M. L. Gellner
Assistant Examiner—J. K. Ham
Attorney, Agent, or Firm—Thomas H. Close

[57] ABSTRACT

A method of making stereoscopic images comprises a first step of exposing a color negative film in a stereoscopic camera to produce a film strip having a plurality of stereo image pairs thereon and then a second step of printing the stereo image pairs onto a color transparency material in a circular pattern. The method may further include the step of punching a disk out of the color transparency material with the stereo image pairs arranged around the circumference of the disk.

5 Claims, 7 Drawing Sheets

METHOD OF MAKING STEREOSCOPIC IMAGES IN A CIRCULAR PATTERN

CROSS REFERENCE TO RELATED APPLICATIONS

This is a divisional of application Ser. No. 08/071,134, filed Jun. 2, 1993, U.S. Pat. No. 5,319,417.

FIELD OF THE INVENTION

The present invention relates to a stereoscopic system of the type including a camera for capturing stereo image pairs, photofinishing equipment and a viewer for viewing stereo image pairs. For example, a system of the type wherein a plurality of stereo image pairs are arranged around the periphery of a disk, the images of the pairs being arranged diametrically opposite each other on the disk, and a method of making such a stereoscopic disk.

BACKGROUND OF THE INVENTION

Figures 7, 8:
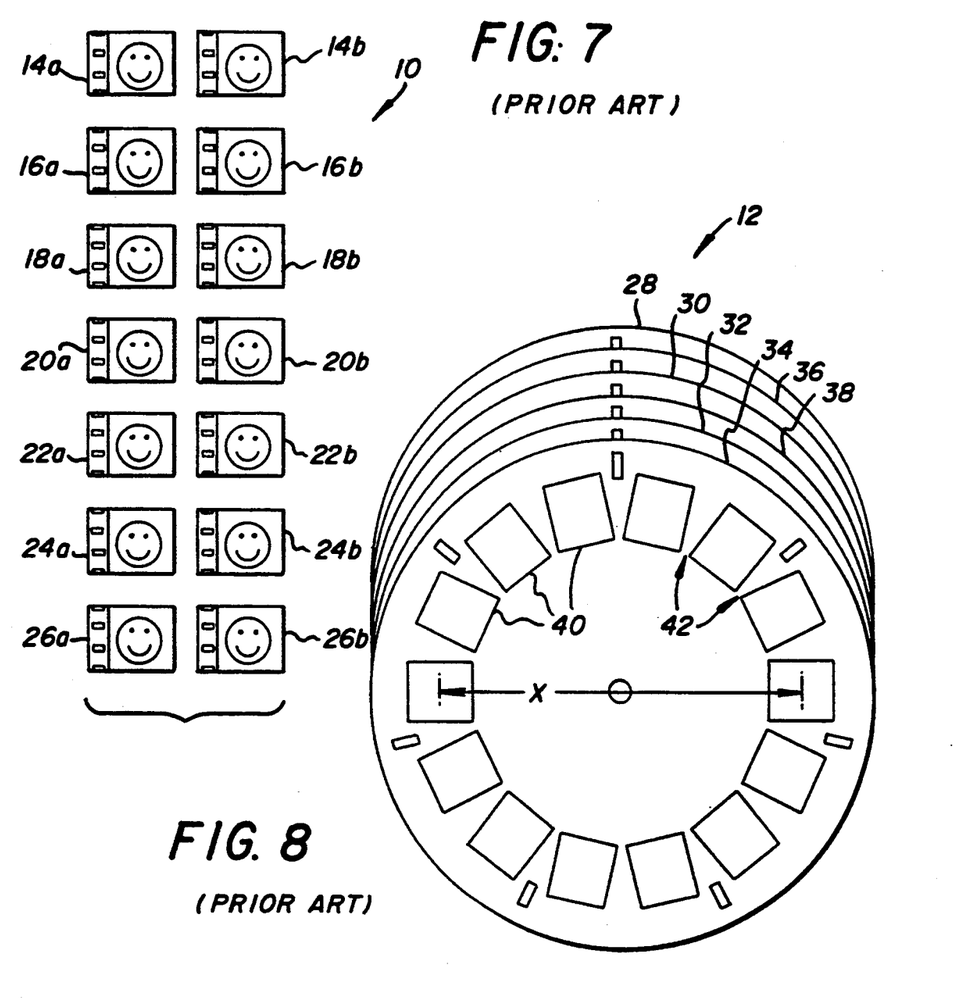
FIG. 7 is a schematic diagram showing the seven stereo pairs of film chips that are employed in a prior art View ®-Master stereoscopic disk.
FIG. 8 is an exploded diagram showing the six laminations of foil and paper employed in the prior art View ®-Master stereoscopic disk.
Figure 9:
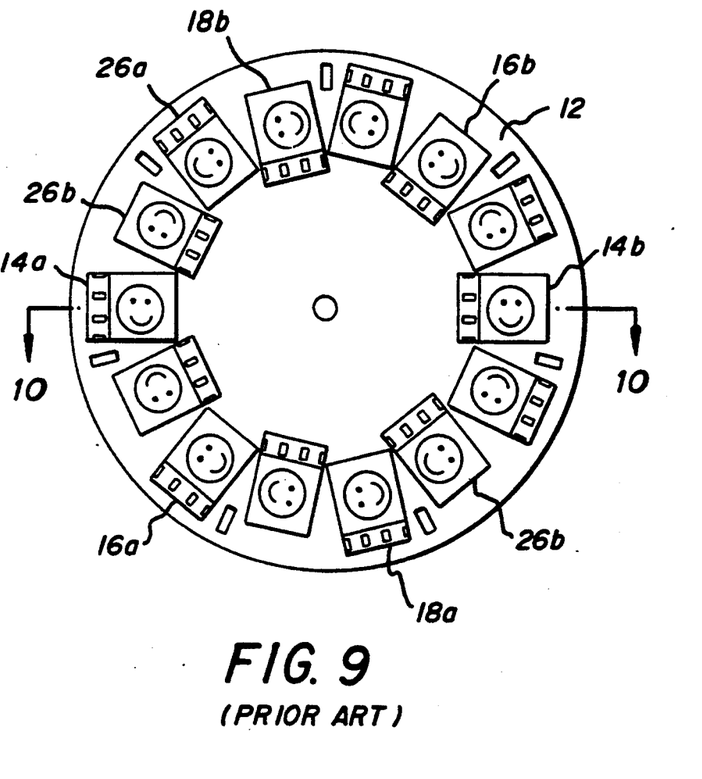
FIG. 9 is a schematic diagram showing how the film chips of FIG. 4 are arranged in the View ®-Master stereoscopic disk.
Figure 10:
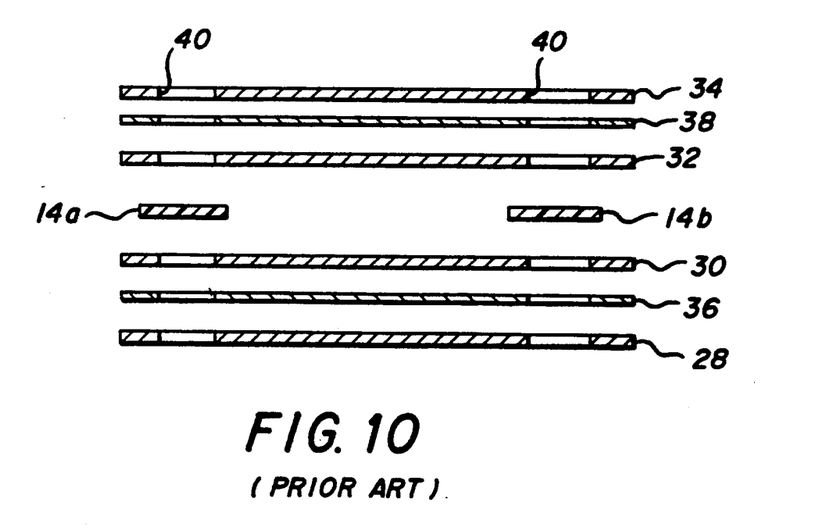
FIG. 10 is a cross sectional view of a prior art View ®-Master disk taken along lines 7—7 in FIG. 6.
Figure 11:
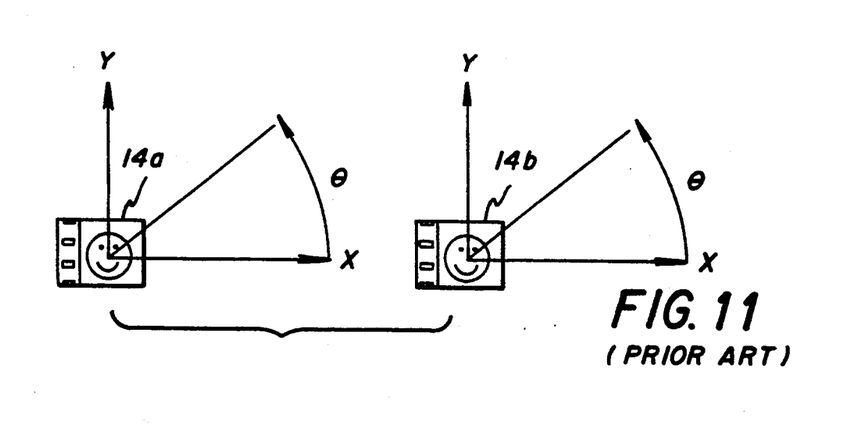
FIG. 11 is a schematic diagram illustrating the alignment of the film chips in the prior art View ®-Master stereoscopic disk.

In a well known system of stereoscopic imaging, transparent stereo image pairs are arranged around the periphery of a disk. The stereo images are viewed by inserting the disk in a binocular viewer. Successive image pairs are viewed by rotating the disk in the viewer, for example, by actuating a lever that engages the disk and rotates the disk by two image widths. Such a stereoscopic imaging system is widely available and sold under the trademark View®-Master. FIGS. 7-11 illustrate the construction of the conventional View®-Master disk. As shown in FIG. 7, the conventional View®-Master disk includes 14 film chips generally designated 10 and as shown in FIG. 8 a disk formed from six layers of laminated paper and foil 12. The film chips 10 representing 7 stereo image pairs 14a, b–26a, b are made from images exposed and developed on 16 mm movie film, and then cut into chips. The paper and foil disk 12 includes four layers of paper 28, 30, 32, and 34, and two layers of foil 36, 38. The paper and foil is prelaminated into two units of paper-foil-paper prior to assembly of the disk. Windows 40 are cut in the paper and foil for mounting the stereo pairs. FIG. 9 shows how the film chips are mounted in the paper and foil laminated disk 12. FIG. 10 is an exploded cross sectional view of a completed View®-Master disk taken along line 7—7 in FIG. 9 showing how the film chips 14a, b are mounted in the windows 40 that are cut in the laminated disk. Referring back to FIG. 8, one of the weak points of the conventional View®-Master disk is the thin web of material 42 between the interior corners of the windows 40 in the laminated disk 12. Because this web of material 42 needs to be at least greater than some minimum dimension, the size of the stereo image for a given number of images, e.g. 14 images separated by a given stereo separation x, e.g. 65 mm is limited to some maximum dimension, e.g. 10×12 mm. Although a 65 mm separation between the images in a stereo pair is comfortable for the average adult, a separation of 55–58 mm is more appropriate for the average child. Unfortunately, if the separation is reduced from 65 mm to 55 mm, the webs 42 become so thin that the disk becomes too fragile for normal use. If the size of the images are reduced, resolution is sacrificed. FIG. 11 illustrates the three degrees of freedom X, Y and θ in which each of the film chips 14a and b must be precisely located. It will be appreciated from the foregoing description that the apparatus for assembling the stereo image disk must be quite complex with many moving parts. One object of the present invention is to provide an improved construction for a stereo image disk that avoids the problems noted above. It would be desirable to be able to produce huge quantities of the stereoscopic disks, for example for advertising purposes. Unfortunately, the cost of the assembly equipment is prohibitive for producing one time large batches of the elements.

Stereoscopic systems are also known in the prior art which employ special stereoscopic cameras to capture stereo image pairs on a film strip. Stereo image chips are punched from the developed film strip, using a special punch designed for use with the camera, and the resulting film chips are manually inserted into a special mounting disk with a tweezer like tool. The special mounting disk is made from a sheet of metal covered on both sides with sheets of paper. See the description of the Stereo Realist system discussed at pages 68–70 in "The World of 3-D" by Jac G. Ferwerda published by 3-D Book Productions, The Netherlands. The Stereo Realist system used color reversal film, which has a very narrow exposure latitude and therefore requires precise exposure control. The cameras were generally expensive to manufacture and the related cutting and mounting hardware was expensive and complicated to use. It would therefore be desirable to provide amateurs with the ability to produce their own stereoscopic images, in particular, stereoscopic disks, that could be viewed in a View®-Master viewer, but it will be appreciated that cameras having sophisticated exposure control and the production of the View®-Master disks as noted above is prohibitively expensive and difficult for all but the most dedicated amateur. It is therefore the object of the present invention to provide an improved stereoscopic system and particularly an improved system for producing stereoscopic disks that overcome the shortcomings noted above.

SUMMARY OF THE INVENTION

According to one aspect of the invention, the object is achieved by providing a photographic printer for printing stereoscopic images including: a film gate for receiving a negative film strip bearing a plurality of stereo image pairs spaced along the film strip; a pair of printing lenses arranged to project an image of a pair of stereo images in said gate onto a printing plane; a print material holder for locating a positive transparency print material in said printing plane; and a mechanism for providing relative rotation between said film gate and said print material holder, whereby a plurality of stereo image pairs may be printed in a circular pattern on the transparency material.

According to another aspect of the present invention, a color negative film is exposed in a stereoscopic camera to produce a negative film strip having a plurality of stereo image pairs, and the negative film strip is printed on a positive color transparency material to make a color stereoscopic image employing the photographic printer according to the present invention. The method of the present invention is particularly suited for use with images made in a single use stereoscopic camera.

DETAILED DESCRIPTION OF THE INVENTION

Figure 1:
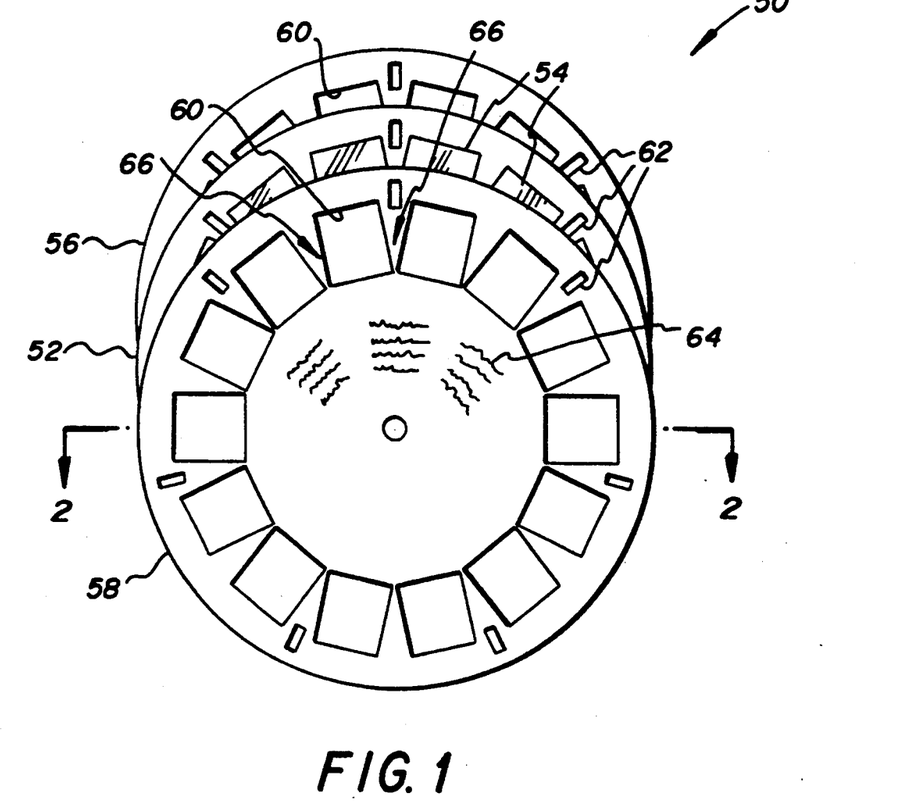
FIG. 1 is an exploded diagram showing a stereoscopic disk produced according to the present invention.

Referring now to FIG. 1, an exploded view of a stereoscopic disk 50 made with a printer according to the present invention. The stereoscopic disk 50 includes a disk 52 of photographic film having a plurality of stereo image pairs 54 arranged around the periphery of the disk 25 in the pattern well known in the art. The film disk 52 is sandwiched between two opaque disks 56 and 58 having windows 60 in which the stereo images 54 are positioned. The opaque disks 56 and 58 are preferably adhesive backed paper but may be formed from an opaque sheet of material such as plastic or metal. The film disk 52 and the opaque disks 56 and 58 are laminated together to form the stereoscopic disk which closely resembles the prior art View ®-Master disk but as can be appreciated, is of much simpler and more rugged construction. A series of detent slots 62 are arranged around the periphery of the disk for locating and rotating the disk in a viewer as is well known in the art. Titles 64 may be provided on the central region of the opaque disk 58 describing the scenes on the disk, as is well known in the art.

Figure 2:
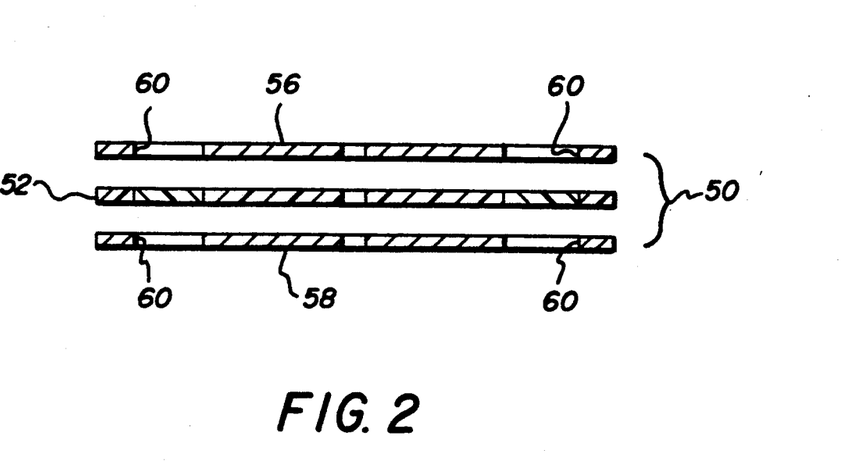
FIG. 2 is a cross sectional view of the stereoscopic disk shown in FIG. 1 taken along lines 2—2.

FIG. 2 shows a cross section of the stereoscopic disk 50 taken along lines 2—2 in FIG. 1. Since the webs 66 of material in the opaque disk between the inside corners of the windows 60 are not required for physical integrity of the completed disk 50, they may be as narrow as desired. The images 54 of the stereoscopic disk 50 may be up to 20% larger in both the horizontal and vertical dimensions than the standard size View ®-Master disk while still maintaining the same separation between images in a stereo pair. Furthermore, since the webs 66 are not needed for mechanical strength of the disk 50, a small "child sized" disk having a stereo-spacing of 55-58 mm may be constructed having the same number and size of images as the standard size View ®-Master disk, thereby preserving the resolution of the images.

Figure 3:
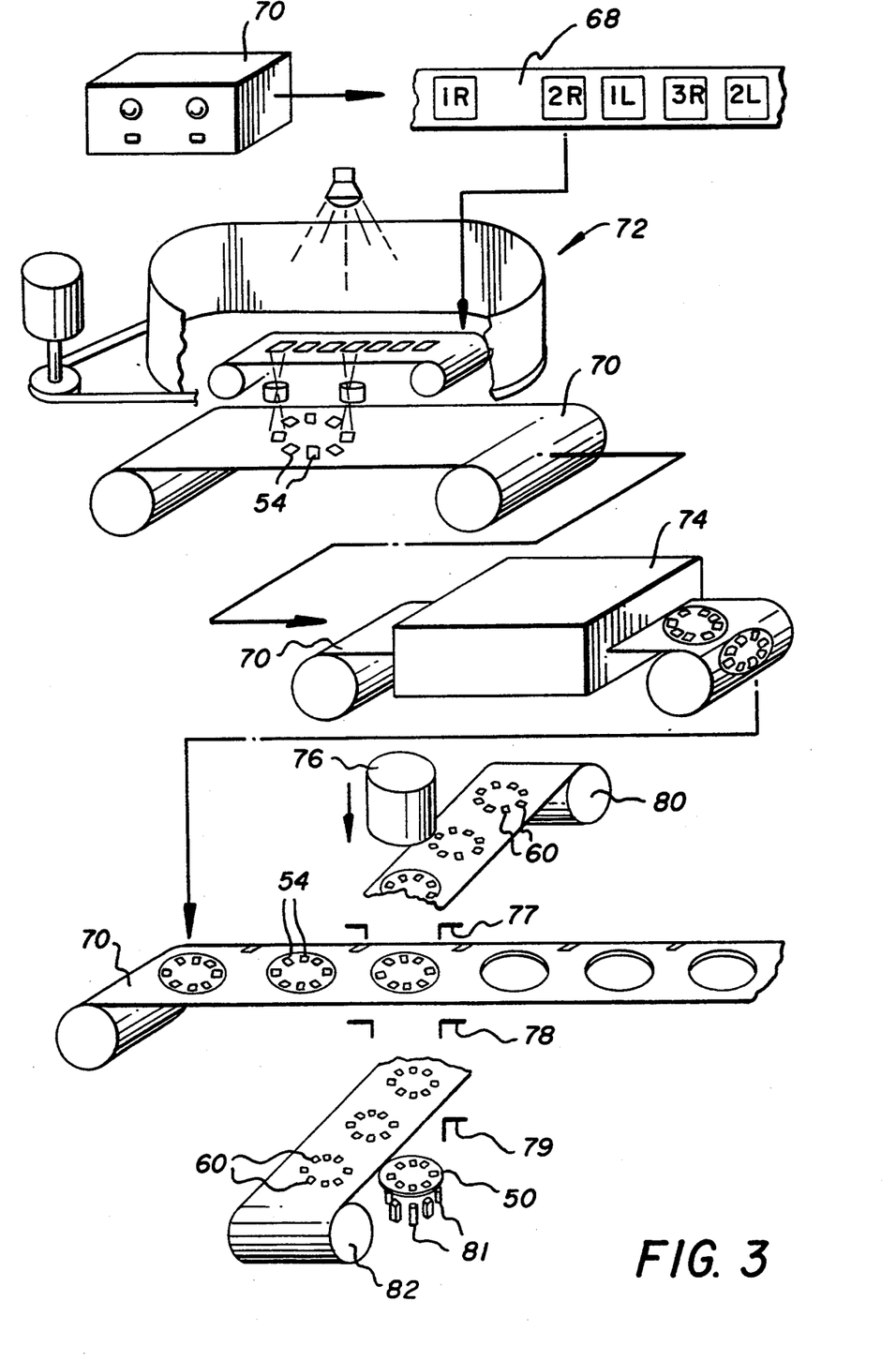
FIG. 3 is a schematic diagram illustrating the method of making the disk shown in FIGS. 1 and 2, according to the present invention.

Referring now to FIG. 3, the method of making the film disk 54 according to the present invention will be described. First, a color negative film 68 such as Kodacolor 100 color negative film is exposed in a stereoscopic camera 70. The stereo image pairs 1L, 1R; 2L, 2R (where L and R indicate left and right images of a pair, respectively) are interlaced on the film 68 as is well known in the art. After processing to develop the images on film strip 68, the color negative images are printed on a wide strip of color transparency film 70 such as Vericolor print film in a special rotary printer 72 described in detail below. The rotary printer 72 exposes the stereo image pairs from this film strip 68 in a circular pattern of stereo image pairs 54 on the print film 70. The print film 70 is developed in a film processor 74. The developed print film 70 is then punched and laminated between strips of adhesive backed paper 80, 82, having pre-cut circular patterns of windows 60. A punch 76 cuts through the paper strip 80 against a die 77, then cuts through the film 70 against a die 78 and finally cuts through the paper strip 82 against a die 79. Punches 81 located at the bottom of the stroke of punch 76 form the periphery slots 62 in the completed stereoscopic disk 50. The circular patterns of stereo images 54 are aligned in the windows 60 in the paper strips 80,82. The resulting stereoscopic disk 50 can be used in any existing View ®-Master viewer.

Figure 4:
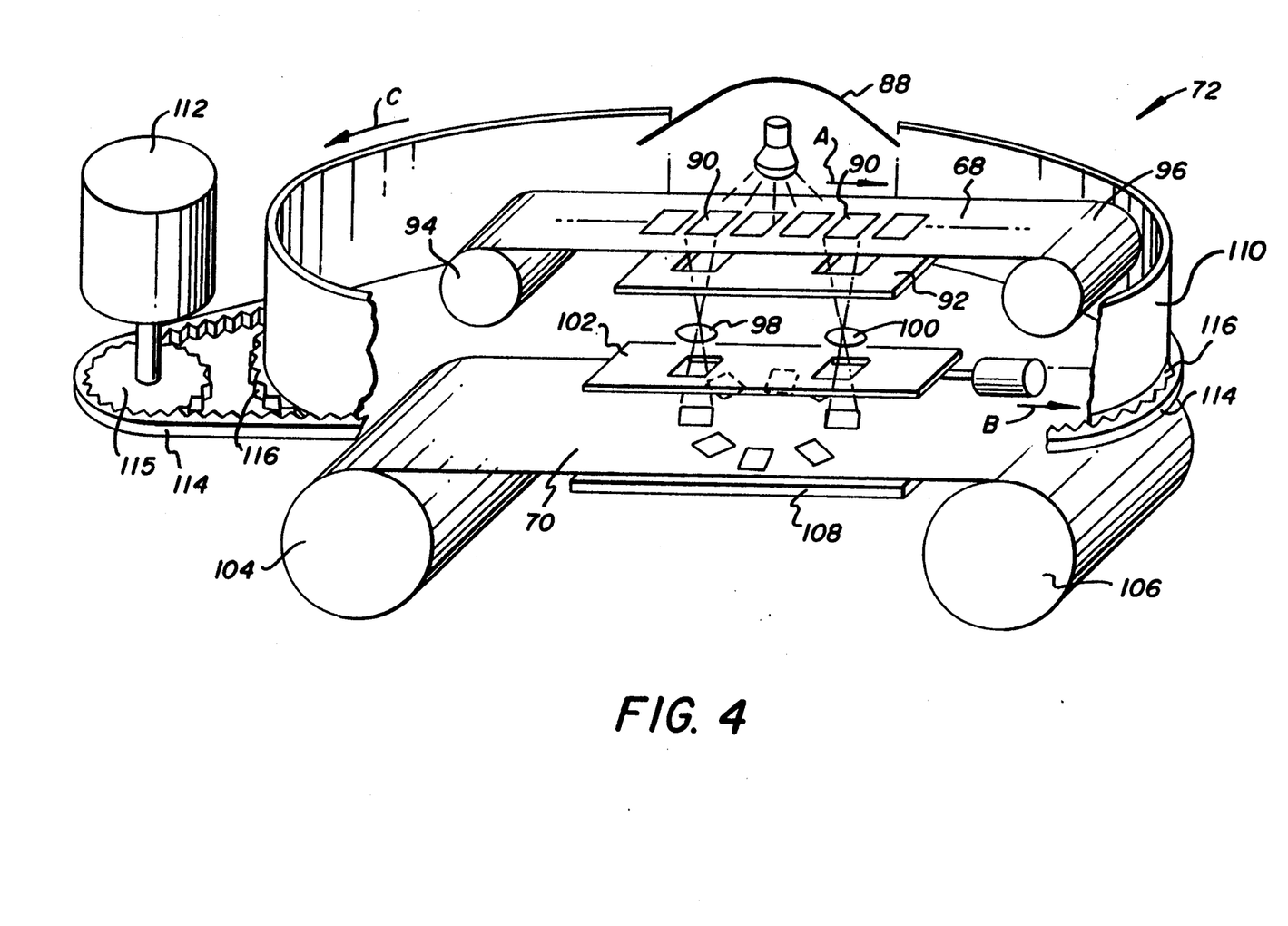
FIG. 4 is a schematic perspective view of a photographic printer according to the present invention.

Referring now to FIG. 4, the printer 72 according to the present invention will be described in more detail. The printer 72 includes a lamp house 88 for illuminating a stereo image pair 90 on a film strip 68. The lamphouse 88 may be either an additive or subtractive lamphouse as is well known in the art. Film strip 68 is positioned in a film gate 92. The film strip 68, comprising for example, a plurality of spliced together film strips is advanced in the direction of arrow A between exposures from a supply 94 to a take-up 96. A pair of printer lenses 98, 100 project an image of the stereo image pair 90 through a shutter 102 onto the transparency film 70. A conventional printer exposure control circuit(not shown) controls the exposure of the printer to compensate for over and under exposure in the camera. The transparency film 70 is advanced in the direction of arrow B from a supply 104 to a take-up 106 after a series of exposures is completed. The transparency film 70 is held in the image plane of lenses 98, 100 by a print material holder 108. The film strip supply 94 and take-up 96, the lenses 98 and 100, and the shutter 102 are mounted on a rotating platform 110 which can be rotated in the direction of arrow C by a drive motor 112. A timing belt 114 meshes with a driving gear 115 and a ring gear 116 on the periphery of platform 110 to drive the platform. The timing belt is preferred to minimize the shock to the optical components during rotation.

In operation, after a stereo pair of images 90 on film strip 68 is printed onto the transparency film 70, the film strip 68 is advanced to the next stereo image pair in the direction of arrow A, the rotating platform 110 is rotated by a desired amount (e.g. two frames), and the next stereo pair of images is exposed. This process is repeated until a complete circle of images is exposed onto the transparency film 70. For example, for the View ®-Master format seven stereo image pairs are exposed in one circle. The transparency film 70 is advanced in the direction of arrow B, and the next series of stereo image pairs is exposed.

Figure 5:
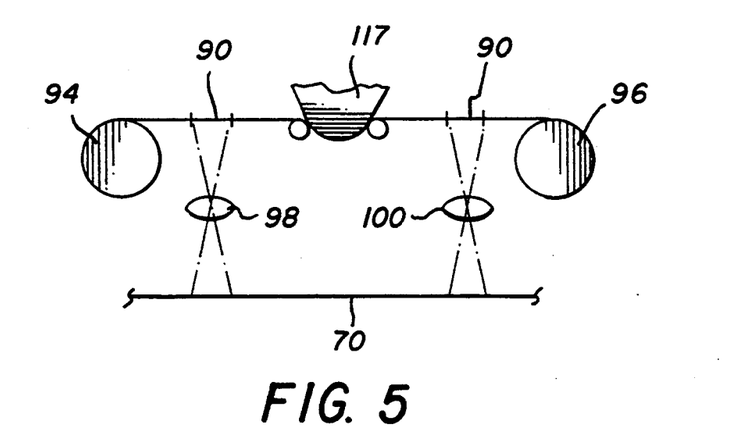
FIG. 5 is a schematic detail of the printer showing one method of achieving an enhanced stereo effect.
Figure 6:
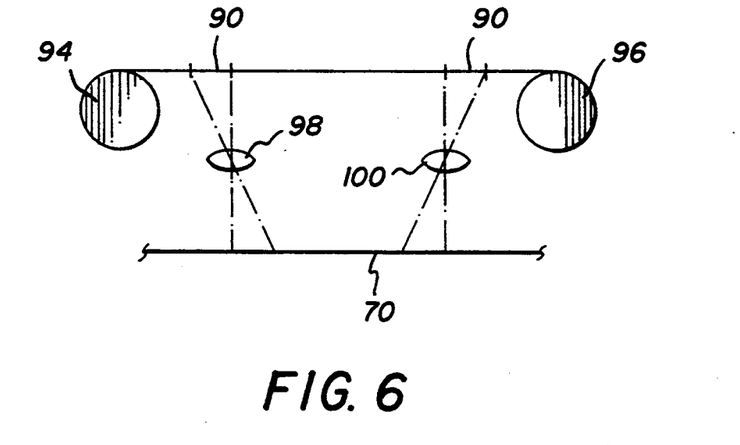
FIG. 6 is a schematic detail of the printer showing an alternative method of achieving enhanced stereo effect.

It is possible to adjust the stereo window and to enhance the effect of the stereo image by exposing the original images in a camera having a lens and image separation greater than the final separation on the disk. For example, if a lens separation of 70 mm and image separation of 71.25 mm is employed in the camera, and the stereo image pairs are printed and viewed at a separation of 65 mm, an enhanced stereo effect will result. One way of achieving the reduced separation in the printer is shown in FIG. 5, where a ramp 117 is provided in the printer 72. The film 68 goes over the ramp 117 to reduce the spacing between the images 90 on the film strip 68. Alternatively, as shown in FIG. 6, the images 90 can be printed off axis in the lenses 98 and 100 to cause the images on the transparency film 70 to be closer together than the images 90 on the negative film strip 68.

Figure 12:
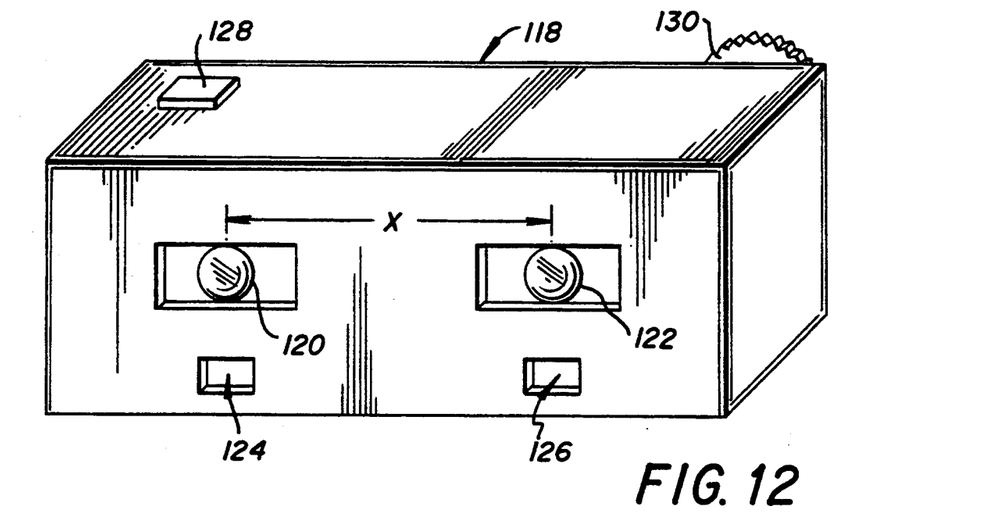
FIG. 12 is a perspective view of a single use stereoscopic camera useful with the present invention
Figures 13, 14, 15:
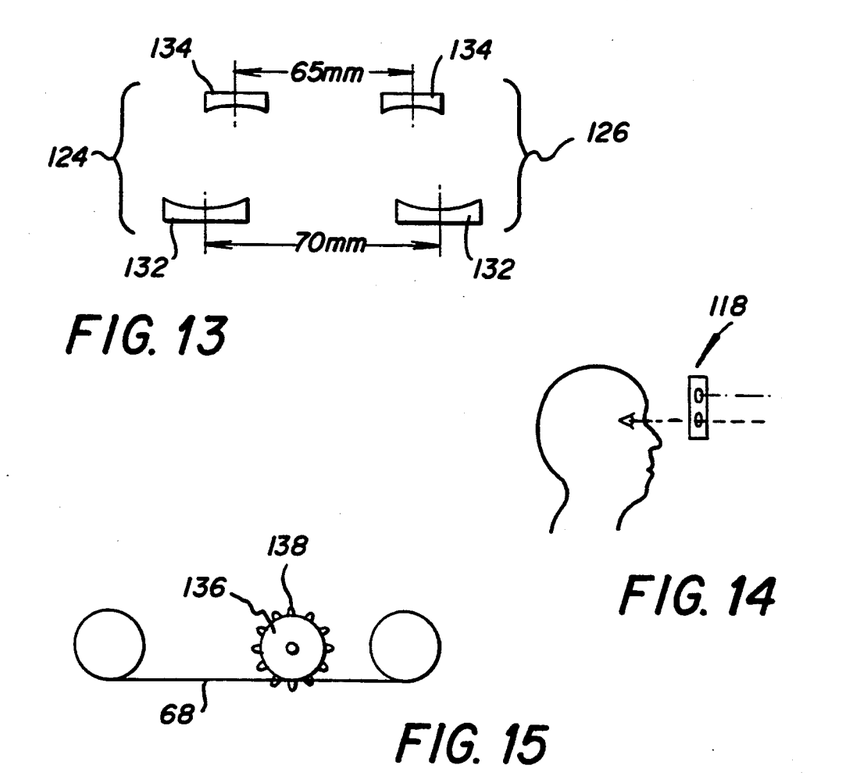
FIG. 13 is a schematic diagram illustrating the viewfinder optics of the single use camera shown in FIG. 12.
FIG. 14 is a schematic diagram illustrating the use of the camera shown in FIG. 12.
FIG. 15 is a schematic diagram illustrating the film advance mechanism of the camera shown in FIG. 12.

By using a color negative film in the stereoscopic camera, and printing onto a positive color transparency film, the wide exposure latitude of color negative photographic systems may be exploited, while still obtaining stereoscopic transparencies. Exposure correction is accomplished in the printer using well known additive or subtractive printer exposure control systems. The resulting wide exposure latitude system enables the original stereoscopic image to be captured in an inexpensive camera having a fixed exposure, such as a single use camera, i.e. a camera that is loaded with film when purchased, and is returned to a photofinisher for processing. FIG. 12 is a perspective view of a single use camera 118, having a pair of taking lenses 120, 122 separated by a distance of, for example, 70 mm. A pair of two element view finder lenses 124, 126, one for each eye, each having a primary lens 132 separated by 70 mm and an eye lens 134 separated by 65 mm, as shown in FIG. 13, allow parallax free viewing of the photographic scene while providing the enhanced stereo images that will be seen in the final display. The double view finder also helps the photographer avoid tilting the camera during exposure. The viewfinder lenses 124,126 are arranged at the bottom of the camera for ease of use by the photographer as shown in FIG. 14. The camera 118 has a shutter release 128. A film advance wheel or lever 130 protruding from the back of the camera allows the film to be advanced by the desired distance between frames. For example, for 35 mm film, the film is advanced by 10 perforations between the frames with a frame size of 24 mm high by 23.25 mm wide. As shown in FIG. 15, a film advance sprocket 136 which engages the sprocket holes in 35 mm film 68 and undergoes one complete rotation upon film advance has 10 sprocket teeth 138.

The camera can be provided with either enough film for a single disk (e.g. seven stereo pair exposures) or for multiple stereoscopic disk (e.g. 7, 14 or 21 stereo pair exposures) for 1, 2 or 3 disks respectively.

| PARTS LIST | |
| --- | --- |
| 10 | film chips |
| 12 | laminated paper and foil layers |
| 14a,b | stereo image pair |
| 16a,b | stereo image pair |
| 18a,b | stereo image pair |
| 20a,b | stereo image pair |
| 22a,b | stereo image pair |
| 24a,b | stereo image pair |
| 26a,b | stereo image pair |
| 28 | paper layer |

| -continued | |
| --- | --- |
| PARTS LIST | |
| 30 | paper layer |
| 32 | paper layer |
| 34 | paper layer |
| 36 | foil layer |
| 38 | foil layer |
| 40 | windows |
| 42 | web of material |
| 50 | stereoscopic disk |
| 52 | photographic film disk |
| 54 | stereo image pairs |
| 56 | opaque disk |
| 58 | opaque disk |
| 60 | windows |
| 62 | detent slots |
| 64 | titles |
| 66 | webs |
| 68 | color negative film |
| 70 | color print film |
| 72 | rotary printer |
| 74 | film processor |
| 76 | punch |
| 77 | die |
| 78 | die |
| 80 | paper strip |
| 82 | paper strip |
| 86 | punch |
| 88 | lamp house |
| 90 | stereo image pair |
| 92 | film gate |
| 94 | supply |
| 96 | take-up |
| 98 | printer lens |
| 100 | printer lens |
| 102 | shutter |
| 104 | supply |
| 106 | take-up |
| 108 | print material holder |
| 110 | rotating platform |
| 112 | drive motor |
| 114 | timing belt |
| 115 | driving gear |
| 116 | ring gear |
| 117 | ramp |
| 118 | single use camera |
| 120 | taking lens |
| 122 | taking lens |
| 124 | view finder |
| 126 | view finder |
| 128 | shutter release |
| 130 | advance wheel |
| 132 | primary viewfinder lens |
| 134 | eye lens |
| 136 | film advance sprocket |
| 138 | sprocket teeth |

We claim:

1. A method of making stereoscopic images, comprising the steps of:
   a. exposing color negative film in a stereoscopic camera to produce a film strip having a plurality of stereo image pairs thereon; and
   b. printing said stereo image pairs onto a color transparency material in a circular pattern.

2. The method of claim 1, further comprising the step of punching a disk out of said color transparency material with said stereo pairs arranged around the circumference of said disk.

3. The method of claim 2 further comprising the steps of:
   aligning a precut circular pattern on at least one paper with said stereo image pairs on said color transparency material; and
   punching out and laminating said paper on to said color transparency material to form said disk.

4. The method of claim 3 further comprising the step of:
   punching out periphery slots in said disk.

5. The method claimed in claim 1 wherein said stereoscopic camera is a single use camera containing color negative film.

* * * * *